(12) United States Patent
Bär et al.

(10) Patent No.: US 8,348,558 B2
(45) Date of Patent: Jan. 8, 2013

(54) CUTTING INSERT AND MILLING CUTTER

(75) Inventors: Jürgen Thomas Bär, Fürth (DE); Jochen Hecht, Ansbach (DE)

(73) Assignee: Kennametal Widia Produktions GmbH & Co.KG, Essen (DE)

( * ) Notice: Subject to any disclaimer, the term of this patent is extended or adjusted under 35 U.S.C. 154(b) by 588 days.

(21) Appl. No.: 12/090,452

(22) PCT Filed: Aug. 22, 2006

(86) PCT No.: PCT/DE2006/001476
§ 371 (c)(1),
(2), (4) Date: Apr. 16, 2008

(87) PCT Pub. No.: WO2007/045194
PCT Pub. Date: Apr. 26, 2007

(65) Prior Publication Data
US 2008/0240871 A1    Oct. 2, 2008

(30) Foreign Application Priority Data
Oct. 20, 2005   (DE) .................. 10 2005 050 210

(51) Int. Cl.
*B23P 15/28*   (2006.01)
(52) U.S. Cl. .......................... 407/113; 407/60
(58) Field of Classification Search .................. 407/113, 407/114, 34, 48, 51, 55, 61, 52
See application file for complete search history.

(56) References Cited

U.S. PATENT DOCUMENTS

| | | | | |
|---|---|---|---|---|
| 4,124,326 A * | 11/1978 | Cost | | 407/114 |
| 4,790,698 A | 12/1988 | Heffron | | 409/200 |
| 5,037,248 A | 8/1991 | Heffron | | 707/12 |
| 5,209,611 A * | 5/1993 | Drescher | | 407/48 |
| 6,146,063 A | 11/2000 | Ramold | | 407/113 |
| 6,238,146 B1 * | 5/2001 | Satran et al. | | 407/113 |
| 6,374,472 B1 | 4/2002 | Ramold | | 29/27 |
| 6,769,842 B2 | 8/2004 | Nerlich | | 407/61 |
| 6,939,091 B2 * | 9/2005 | Wermeister | | 407/113 |
| 7,097,393 B2 * | 8/2006 | Satran et al. | | 407/113 |
| 7,101,121 B2 * | 9/2006 | Wermeister et al. | | 407/113 |
| 7,275,895 B2 * | 10/2007 | Heinloth | | 407/113 |

FOREIGN PATENT DOCUMENTS

| | | |
|---|---|---|
| DE | 19743971 | 4/1999 |
| EP | 0286771 | 10/1988 |
| JP | 05050315 | 3/1993 |
| JP | 2000126922 A * | 5/2000 |
| JP | 2001219313 A * | 8/2001 |
| KR | 2006034953 A * | 4/2006 |

* cited by examiner

*Primary Examiner* — Kenneth E. Peterson
*Assistant Examiner* — Jennifer Swinney
(74) *Attorney, Agent, or Firm* — Larry R. Meenan, Esq.

(57) ABSTRACT

The invention relates to a cutting insert having an essentially parallelepiped-shaped basic body with two larger spaced-apart longitudinal surfaces (10,11) which are connected to one another by two smaller transverse surfaces (12, 13) and two smaller longitudinal surfaces (14) designed as rake faces, wherein the smaller longitudinal surfaces (14) form with the adjacent surfaces a respective, encircling, closed cutting line which forms the cutting edges and rounded-off cutting corners, and the larger longitudinal surface (10, 11) merges on both sides via respective rounded-off edges into the smaller transverse surface (12, 13), and one of the rounded-off cutting corners is designed so as to project relative to a basic shape which is determined by the cutting lines, on both sides, of the larger longitudinal surfaces (10, 11) with the smaller longitudinal surfaces (14).

21 Claims, 4 Drawing Sheets

US 8,348,558 B2

CUTTING INSERT AND MILLING CUTTER

CROSS REFERENCE TO RELATED APPLICATIONS

This application is the US national phase of PCT application PCT/DE2006/001476, filed 22 Aug. 2006, published 26 Apr. 2007 as WO 2007/045194, and claiming the priority of German patent application 102005050210.5 itself filed 20 Oct. 2005, whose entire disclosures are herewith incorporated by reference.

FIELD OF THE INVENTION

The invention relates to a cutting insert having an essentially parallepipedal base body with two opposite wide longitudinal faces and bridged by two narrow transverse faces and two narrow surfaces forming cutting faces, with the narrow longitudinal faces each forming an annular, closed edge strip with the adjacent surface that forms the cutting edges and rounded cutting corners, and with the wide longitudinal faces merging on both sides into the narrow transverse faces via rounded corners.

The invention further relates to a milling cutter with a base body formed as a bar or disk to which radial and tangential cutting inserts have been fixed.

DE 197 43 971 illustrates that, in material-removal machining in which cutting inserts are simultaneously orbited about a center and moved radially of the rotation axis, multiple cutting inserts are alternated in lateral and tangential arrangements on a tool holder, in particular a disk milling cutter. A tangential arrangement should be understood to mean that the cutting insert is arranged on the outer periphery of the disk milling cutter and is fastened centrally of the milling tool, whereas in a lateral arrangement the cutting insert is provided on an axially directed face of the milling tool, with the cutting edge extending radially. Depending on the desired cutting width of the tool provided the holder and including multiple cutting inserts, a corresponding number of cutting inserts is provided one next to the other. Due to the considerable wear on cutting inserts, indexable plates with multiple usable cutting edges are used. The number of usable cutting edges is determined by the envelope of the cutting insert; in the case of a rectangular shape, a maximum of four cutting edges per side results. The strict rectangular shape of a cutting insert in which the wide longitudinal faces merge into narrow transverse faces via rounded corners forms two cutting faces on opposite sides, each having four cutting corners each of which is formed by one short and one long cutting edge. In the machining of crankshafts, such cutting inserts are essentially suitable for machining the lateral flanks and the pin bearing, as well as the formation of an oil flange.

In contrast, for so-called undercut processes, a cutting insert is used that has wide longitudinal faces with different lengths that are connected to one another by transverse faces extending at an oblique angle such that these transverse faces, as well as the corresponding rounded corners, result in a cutting corner on each of the four ends of the parallepipedal block that has an obtuse angle but is asymmetrical in shape.

The cutting inserts according to DE 197 43 971 are described as a variant type of cutting insert in which the long cutting edges of a rectangular cutting insert are interrupted by grooves such that each long cutting edge is divided into two short cutting edge sections.

Other information regarding the machining of crankshafts by exterior milling is provided, for example, in EP 0 830 228 [U.S. Pat. Nos. 6,374,472 and 6,146,063]. As an alternative to the disk milling cutters used there, crankshafts may also be processed using so-called "turn-clear" or "turn-turn-clear" tools. This term is understood to mean a straight bar-shaped tool that is mounted radially on the rotating workpiece to be processed. On a partial outer periphery of the disk-shaped tool holder, several consecutive cutting inserts are provided that increase continually in stages along a first section of the outer periphery of the disk. This tool is pivoted along a partial arc in the radial direction toward the workpiece, which is principally described in EP 0 313 644 [U.S. Pat. Nos. 4,790,698 and 5,037,248] or EP 0 286 771. Differently shaped cutting inserts are also used on such bar-shaped or disk-shaped tool holders for pin machining and for the fabrication of an undercut.

In addition to the processes mentioned above, so-called internal milling is known as well in which a disk-shaped milling tool is used as well, albeit with the provision that the cutting inserts are provided on the interior jacket side of a ring wheel.

The costs for machining a workpiece, in particular a crankshaft, have multiple components. In addition to the pure machining times that are determined by the shape as well as the material of the workpieces and the rotation or grinding speeds coordinated therewith, idle periods in which the tool machine must be refitted also have the effect of increasing costs. It is known that tool costs may be reduced by the use of so-called indexable plates that have multiple cutting edges that may be used one after the other, although their number is limited by virtue of the shape used.

According to the prior art, indexable plates are used in milling crankshafts in which the various cutting operations for producing the crankshaft diameter, the crankshaft flanks, the oil flange, and the undercut are performed with cutting inserts that are specially shaped for these purposes. Essentially, different cutting inserts are used for the production of the undercut, as well as machining the diameter and machining the oil flange of a crankshaft.

The optimization of such cutting inserts of only one type of processing each, i.e. undercut production has been exhausted to a large degree because, due to the geometric requirements, the number of usable cutting edges can no longer be increased. However, it is disadvantageous for different types of cutting inserts to need to be mounted on tool holders, which may lead to mistakes during mounting. However, incorrectly mounted tools are either unable or insufficiently able to fulfill their function; in the worst case, an out-of-place cutting insert could even cause irreparable damage to the tool. Moreover, a plurality of tools with different geometries has the disadvantage of higher storage costs, which also counts as a negative when calculating the workpiece costs.

OBJECT OF THE INVENTION

The object of the present invention is therefore to create a cutting insert and a milling tool by means of which the disadvantages mentioned above may be removed; in particular, the cutting tool should be able to perform as many different cutting operations as possible, which are necessary when machining a crankshaft.

SUMMARY OF THE INVENTION

This object is attained by means of a cutting insert in which one of the rounded cutting corners projects outward from an envelope defined by the edge strips of the wide longitudinal faces with the narrow longitudinal face. Preferably, this projection extends over the entire width of the large longitudinal face and is formed by a ridge such that projections with mirror symmetry are formed on both ends of the ridge. In contrast to the pure rectangular shape with rounded corners, in which the shortest cutting width is determined by the height of the narrow transverse face and/or the distance of the wide longitudinal faces from one another, the cutting insert according to the invention is able due to the projection to be used to produce narrow undercuts as well. Because only one cutting corner on a cutting face projects, the remaining three corners resulting from the rectangular shape are retained; in particular; a long cutting edge is available that is flanked on both sides by two cutting corners. This wide cutting surface may be used in particular for diameter machining, in particular rough grinding work. As will be described in detail below with reference to the description of the illustrated embodiment, the cutting insert according to the invention results in a total of eight usable cutting surfaces that may be used in the following manner:

The projection as well as the adjacent long cutting edge are to be used for undercut production and diameter work (in particular undercut machining). For this purpose, the cutting insert is fixed tangentially.

Also when the cutting insert is fixed tangentially, albeit rotated by 180°, a pin diameter may be produced along with a truncated oil flange. The cutting edge diametrically opposite the projection may be used for the rough grinding of an oil flange (with a lateral and/or radial orientation of the cutting insert). Finally, the short cutting edge may be used for the rough grinding of the diameter with the cutting insert being fixed in a lateral manner.

The contour of the projection or ridge is essentially determined by the shape of the undercut or oil flange to be produced. Preferably, each projection has an end flank that runs in perpendicular or oblique to the neighboring straight cutting edge section, with this end flank preferably being adjacent to a flat face that merges into a rounded corner region. The projection of the cutting insert may be symmetrical or asymmetrical to a bisecting line of an angle running through the corner in question.

According to a further embodiment of the cutting insert according to the invention, the rounded corner region of the projection or protruding section of the cutting edge has a radius that is at a maximum equal, preferably less than, the corner radii of the remaining cutting corners. For example, three cutting corners may have equal radii of 2.5 mm and the projection may have a cutting corner radius of 1.8 mm.

Preferably, the radius of the corner region that is projection is a maximum of 3 mm, more preferably 1.7 mm to 2.5 mm.

The transition regions from the cutting edge section running in a straight line to the end flank are rounded and, according to a particular embodiment of the invention, have a radius of 0.5 mm+/−0.1 mm.

The object of the invention mentioned at the outset is also attained by a milling cutter according to the present invention. This milling cutter is at least partially fitted with cutting inserts of the type described above, preferably exclusively with such cutting inserts, that are fixed alternatingly laterally (radially) and tangentially.

BRIEF DESCRIPTION OF THE DRAWING

Other advantages and embodiments are explained below with reference to the drawings, wherein.

SPECIFIC DESCRIPTION

Figure 1A:
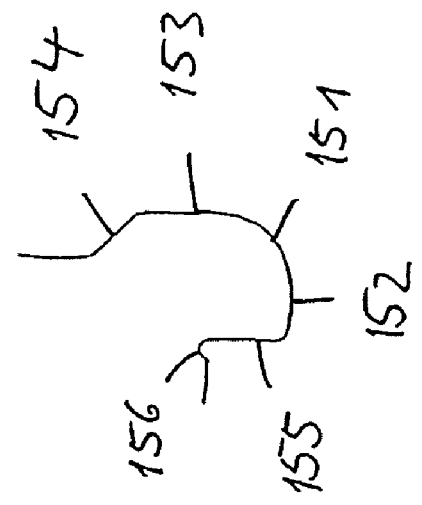
FIG. 1a is a detail view of the projection.

The cutting insert according to the invention has two wide longitudinally extending faces 10 and 11 extending parallel to one another, two narrow transversely extending faces 12 and 13 as well as two narrow longitudinally extending faces 14 oriented opposite one another and forming as cutting faces. According to the invention, the cutting insert has a projection 15 relative to its strictly geometric parallepipedal block shape with rounded corners, which is formed on both sides on the cutting surface as a ridge 16 that extends transversely over the entire width of the cutting insert. This shape results in a long cutting edge 17 that is flanked on both ends by cutting corners 18 and 19, a short cutting edge 20 that is flanked by cutting corners 18 and 21, as well as another long cutting edge 22 that ends at one end at the projection 15 at and at the opposite end at the cutting corner 21. As shown in FIG. 1a, the projection 15 has a rounded corner 151 as well as adjacent flat faces 152 and 153 that are flanked either by an angled end flank 154 or a perpendicular end flank 155, which extend in turn to the cutting edges 13 and 22. Optionally, a groove 156 may be provided as well.

Figure 2:
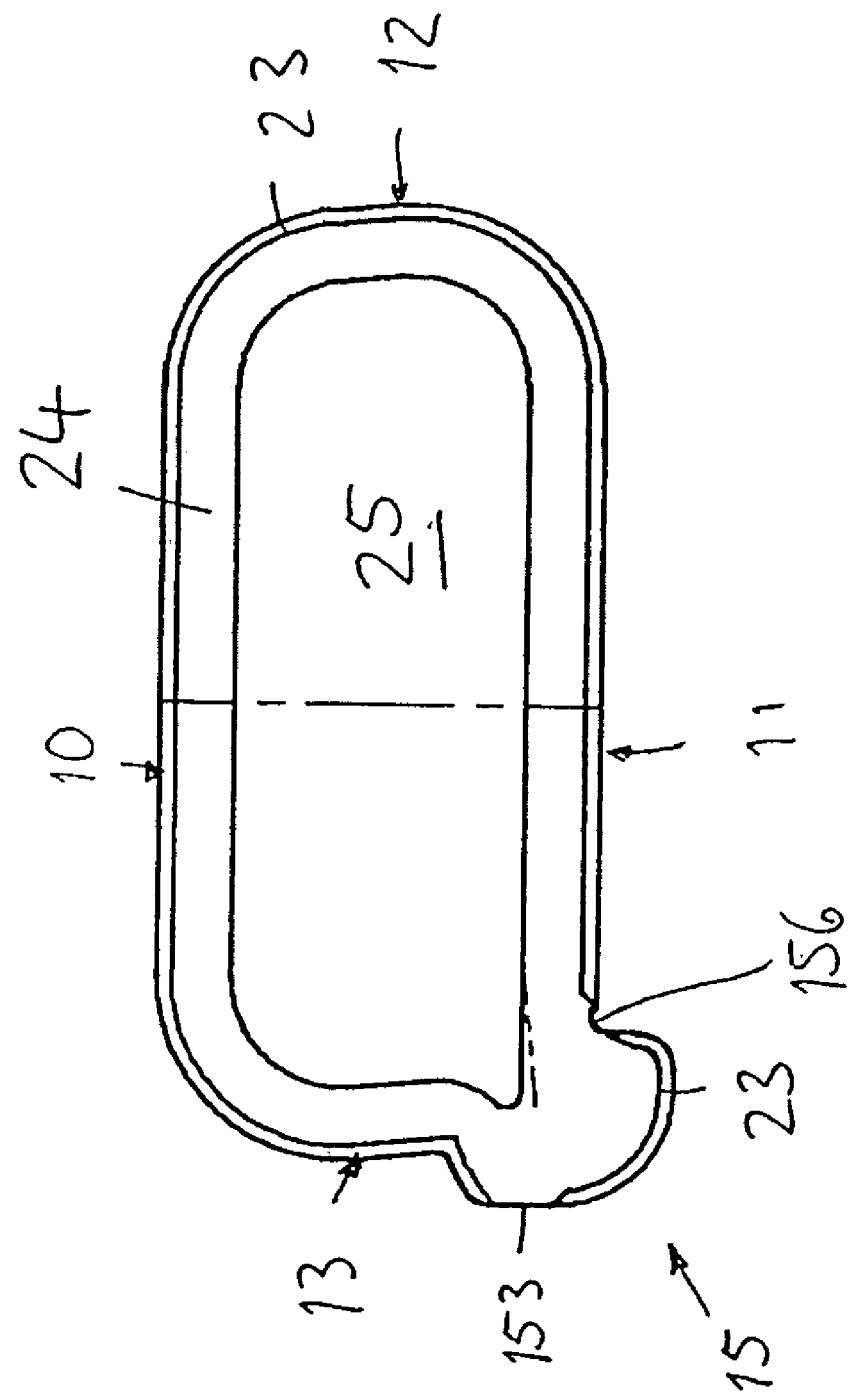
FIG. 2 is a plan view of the cutting surface of the cutting insert according to the invention in a further embodiment.

As may be seen in particular from FIG. 2, a bevel 23 may be provided at least partially along the cutting edges that is interrupted only in the region of the flat face 153 and in the region of the groove 156.

Moreover, the cutting insert may have descending flanks 24 that extend at a positive (cutting) angle. Naturally, the option is available of arranging chip-shaping elements as bumps and/or depressions in the region of the descending flanks or in the central region 25 that is bordered by the descending flanks 24.

According to a concrete embodiment, the radii in the cutting corners 18, 19, and 21 are 2.5 mm, whereas the radius of the cutting corner 151 is shorter, for example, 1.8 mm. The protective bevel 23 should, if possible, be less than 0.1 mm, in particular 0.08 mm, wide. The short transverse face 13 is not oriented precisely parallel to the transverse face 12, but rather is directed at an angle of 5° thereto.

The cutting inserts have a through bore 26 for accommodating a mounting screw.

Figure 1:
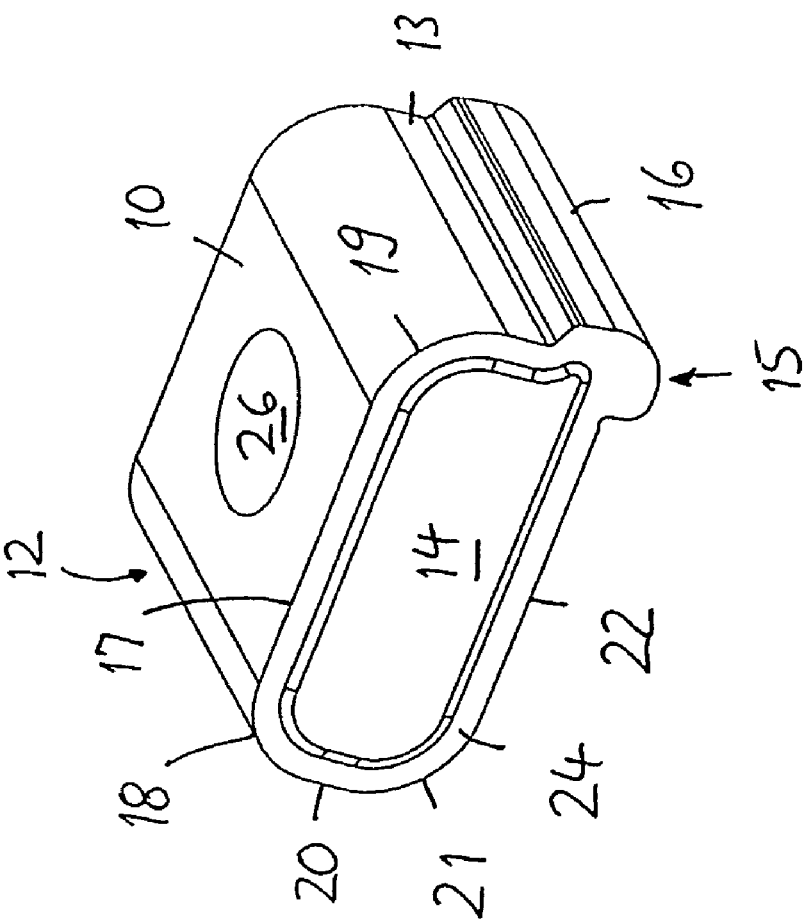
FIG. 1 is a perspective view of the cutting insert according to the invention.
Figure 3:
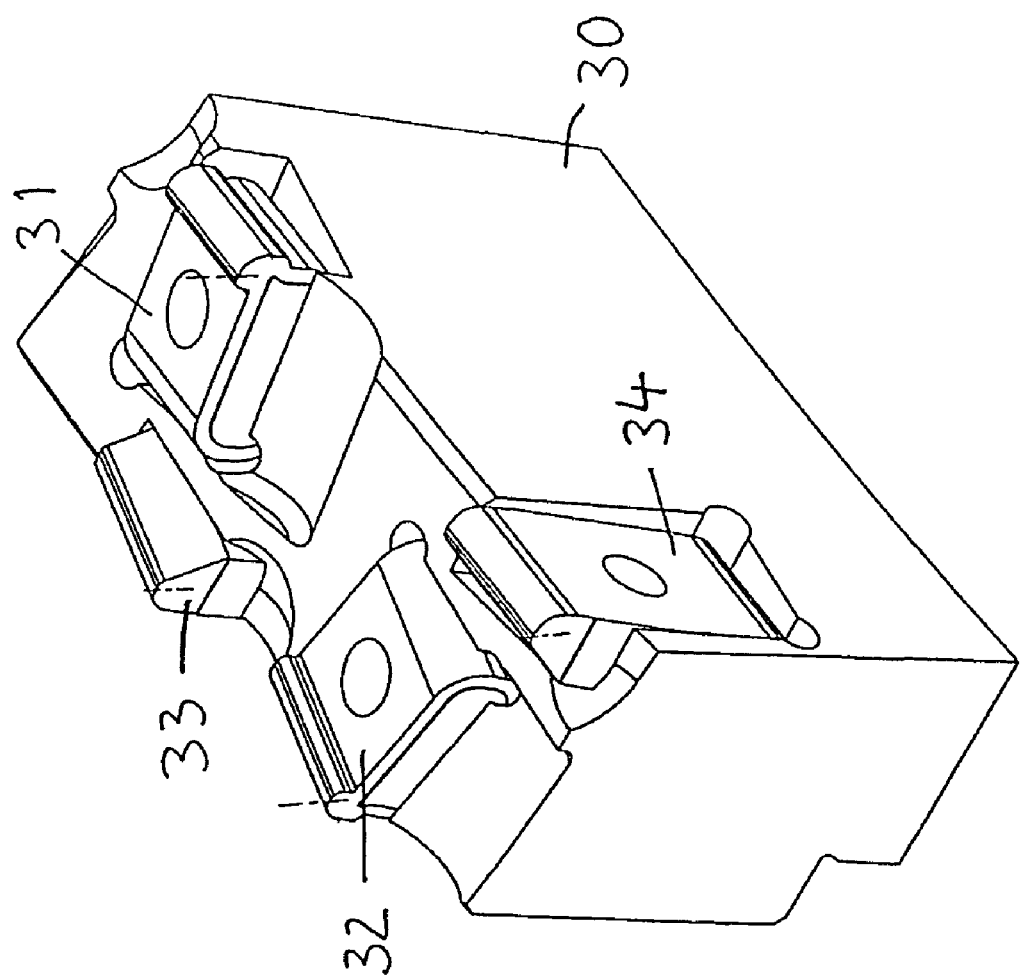
FIG. 3 is a schematic partial perspective view of a tool miller in a first embodiment.
Figure 4:
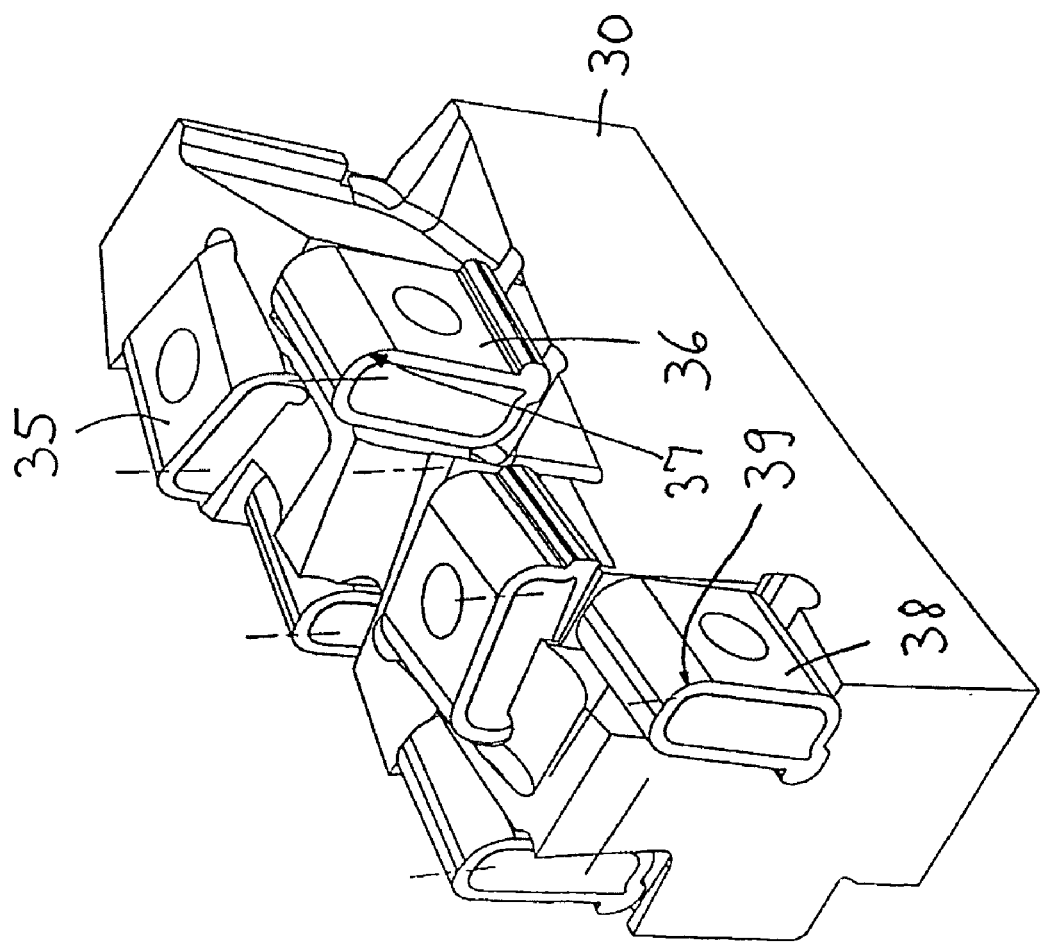
FIG. 4 is a perspective view of a tool miller in a second embodiment.

FIGS. 3 and 4 show possible uses of the cutting insert according to the invention in a disk milling cutter 30. The cutting inserts 31 and 32 according to the invention are fixed in a tangential manner, with their cutting edges 22 (see FIG. 1) being used in conjunction with the projection 15 to produce an undercut for crank-pin machining, in particular as finish machining. The cutting inserts 33 and 34, which are fixed to the axial end faces and known from the prior art, have an essentially obtuse-angled cutting edge by means of which an undercut may be produced for rough grinding. Corresponding to the scope of the object of the invention described above, the projections 15 of the cutting insert according to the invention extend in such a way that they slightly overlap the cutting edges 33 and 34.

FIG. 4 shows a milling cutter in which only cutting inserts according to the invention are used, fixed in a lateral and tangential manner. The cutting insert 35, which is fixed in a tangential manner, cuts a pin diameter as well as an oil groove (laterally). The cutting insert 36 is fastened laterally to the tool holder 30, with its cutting edge 37 being used as a lateral primary cutting edge.

The cutting insert 38 with its cutting edge 39 is used for machining an oil flange. All of the cutting inserts according to FIG. 4 are used for the (rough) grinding of a crankshaft, whereas the cutting inserts 31 and 32 are used for finish machining.

From the statements above, it can be seen that the indexable plate according to the invention has a total of eight usable cutting edges by means of which the following four processing steps may be performed, namely the finish machining of an undercut in connection with pin diameter machining, diameter is rough grinding, as well as the machining of a truncated oil flange, oil flange machining (by means of the projection 15), and diameter rough grinding in connection with tangential machining. Depending on the orientation of the cutting insert on a tool holder (in particular a disk milling cutter), smooth or rough machining can be done.

According to one embodiment of the invention, the cutting inserts may also be fixed in cassettes known from the prior art and aligned correspondingly.

By means of the cutting inserts and milling cutters according to the invention, the machining of nonferrous metals, iron, as well as in particular steel and cast iron is possible. The cutting inserts are composed of a hard metal or a cermet that, depending on the type of cutting and types of materials, may also be coated with one or more coatings, for example, metal carbides, nitrides, carbon nitrides, or aluminum oxide.

The particular advantages of the new cutting insert lie in the fact that four different cutting inserts may be replaced, considerably simplifying stocking. The resulting reduction in stock costs also has the effect of reducing production costs. Other savings result from the fact that a lower number of presses and cutting tools are needed because, instead of four different tool shapes, only one tool shape need be produced.

The invention claimed is:

1. A cutting insert, comprising:
a substantially parallelepiped-shaped base body including a first wide longitudinal face and a second wide longitudinal face extending parallel to the first wide longitudinal face, a first narrow transverse face extending between the first and second wide longitudinal faces, a second narrow transverse face extending between the first and second wide longitudinal faces, and first and second narrow longitudinal faces extending between the first and second wide longitudinal faces and the two narrow transverse faces, respectively,
the base body further including a first rounded cutting corner formed at an intersection between the first wide longitudinal face and the first narrow transverse face, a second rounded cutting corner formed at an intersection between the second wide longitudinal face and the first narrow transverse face, a third rounded cutting corner formed at an intersection between the first wide longitudinal face and the second narrow transverse face, and a fourth rounded cutting corner formed by projection extending outwardly from the second wide longitudinal face and extending outwardly from the second narrow transverse face,
wherein a radius of the fourth rounded cutting corner formed by the projection is different than a radius of the first, second and third rounded cutting corners.

2. The cutting insert according to claim 1, further comprising a first long cutting edge formed at an intersection between the first wide longitudinal face and the first narrow longitudinal face, a second long cutting edge formed at an intersection between the second wide longitudinal face and the first narrow longitudinal face, a third long cutting edge formed at an intersection between the first wide longitudinal face and the second narrow longitudinal face, and a fourth long cutting edge formed at an intersection between the second wide longitudinal face and the second narrow longitudinal face.

3. The cutting insert according to claim 1, further comprising a first short cutting edge formed at an intersection between the first narrow longitudinal face and the first narrow transverse face, and a second short cutting edge formed at an intersection between the second narrow longitudinal face and the first narrow transverse face.

4. The cutting insert according to claim 1, wherein the projection further includes a first flat face and a second flat face, and wherein the rounded corner is disposed between the first and second flat faces.

5. The cutting insert according to claim 1, wherein the projection further includes an end flank that is substantially perpendicular to the first and second wide longitudinal faces.

6. The cutting insert according to claim 1, wherein the projection further includes a groove adjacent the second wide longitudinal face.

7. The cutting insert according to claim 1, wherein the projection further includes an angled end flank adjacent the second narrow transverse face.

8. The cutting insert according to claim 1, wherein the projection extends entirely between the first and second narrow longitudinal faces.

9. The cutting insert according to claim 1, wherein the radius of the rounded corner of the projection is smaller than the radius of the first, second and third rounded cutting corners.

10. The cutting insert according to claim 1, further including a bevel formed in one of the first and second narrow longitudinal faces.

11. The cutting insert according to claim 1, further including a descending flank formed in one of the first and second narrow longitudinal faces.

12. The cutting insert according to claim 1, wherein the first narrow transverse face is formed at a non-zero angle with respect to the second narrow transverse face.

13. The cutting insert according to claim 1, further including a through bore extending between the first and second wide longitudinal faces.

14. A cutting insert, comprising:
a substantially parallelepiped-shaped base body including a first wide longitudinal face and a second wide longitudinal face extending parallel to the first wide longitudinal face, a first narrow transverse face extending between the first and second wide longitudinal faces, a second narrow transverse face extending between the first and second wide longitudinal faces, and first and second narrow longitudinal faces extending between the first and second wide longitudinal faces and the two narrow transverse faces, respectively;
the base body further including a first rounded cutting corner formed at an intersection between the first wide longitudinal face and the first narrow transverse face, a second rounded cutting corner formed at an intersection between the second wide longitudinal face and the first narrow transverse face, a third rounded cutting corner formed at an intersection between the first wide longitudinal face and the second narrow transverse face;
a first long cutting edge formed at an intersection between the first wide longitudinal face and the first narrow longitudinal face, a second long cutting edge formed at an intersection between the second wide longitudinal face and the first narrow longitudinal face, a third long cutting edge formed at an intersection between the first wide longitudinal face and the second narrow longitudinal face, and a fourth long cutting edge formed at an intersection between the second wide longitudinal face and the second narrow longitudinal face; and a first short cutting edge formed at an intersection between the first narrow longitudinal face and the first narrow transverse face, and a second short cutting edge formed at an intersection between the second narrow longitudinal face and the first narrow transverse face, wherein the base body further includes a projection extending outwardly from the second wide longitudinal face and extending outwardly from the second narrow transverse face and extending entirely between the first narrow longitudinal face and the second narrow longitudinal face, and wherein the projection includes a fourth rounded cutting corner, a first flat face and a second flat face, and wherein the fourth rounded cutting corner is disposed between the first and second flat faces.

15. The cutting insert according to claim 14, wherein the projection further includes an end flank that is substantially perpendicular to the first and second wide longitudinal faces.

16. The cutting insert according to claim 14, wherein the projection further includes a groove adjacent the second wide longitudinal face.

17. The cutting insert according to claim 14, wherein the projection further includes an angled end flank adjacent the second narrow transverse face.

18. The cutting insert according to claim 14, wherein the radius of the fourth rounded cutting corner of the projection is smaller than the radius of the first, second and third rounded cutting corners.

19. The cutting insert according to claim 14, wherein a radius of the fourth rounded cutting corner of the projection is different than a radius of the first, second and third rounded cutting corners.

20. The cutting insert according to claim 14, further including a bevel formed in one of the first and second narrow longitudinal faces.

21. The cutting insert according to claim 14, wherein the first narrow transverse face is formed at a non-zero angle with respect to the second narrow transverse face.

* * * * *

UNITED STATES PATENT AND TRADEMARK OFFICE
CERTIFICATE OF CORRECTION

PATENT NO. : 8,348,558 B2
APPLICATION NO. : 12/090452
DATED : January 8, 2013
INVENTOR(S) : Jurgen Thomas Bar et al.

It is certified that error appears in the above-identified patent and that said Letters Patent is hereby corrected as shown below:

In Column 3, Line 61, delete "DRAWING" and insert -- DRAWINGS --, therefor.

In Column 5, Line 14, delete "diameter is" and insert -- diameter --, therefor.

In Column 5, Line 57, in Claim 1, delete "by projection" and insert -- by a projection --, therefor.

Signed and Sealed this
Second Day of April, 2013

Teresa Stanek Rea
*Acting Director of the United States Patent and Trademark Office*